(12) United States Patent
Thauern et al.

(10) Patent No.: US 8,882,903 B2
(45) Date of Patent: Nov. 11, 2014

(54) ALUMINIUM PHOSPHATE DIHYDRATE AS WHITE PIGMENT IN PAINTS

(75) Inventors: Henrike Thauern, Mannheim (DE);
Michael Schmitt, Heidelberg (DE);
Thomas Staffel, Grünstadt (DE)

(73) Assignee: BK Giulini GmbH, Ludwigshafen (DE)

( * ) Notice: Subject to any disclaimer, the term of this patent is extended or adjusted under 35 U.S.C. 154(b) by 323 days.

(21) Appl. No.: 12/667,512

(22) PCT Filed: Jun. 28, 2008

(86) PCT No.: PCT/EP2008/005307
§ 371 (c)(1),
(2), (4) Date: Dec. 31, 2009

(87) PCT Pub. No.: WO2009/007030
PCT Pub. Date: Jan. 15, 2009

(65) Prior Publication Data
US 2010/0180801 A1 Jul. 22, 2010

(30) Foreign Application Priority Data
Jul. 10, 2007 (DE) .......................... 10 2007 031 960

(51) Int. Cl.
| | |
|---|---|
| C09C 1/40 | (2006.01) |
| C09D 5/00 | (2006.01) |
| C09D 5/02 | (2006.01) |
| C09D 7/12 | (2006.01) |
| C09D 5/08 | (2006.01) |
| C09C 1/00 | (2006.01) |
| C01B 25/36 | (2006.01) |
| C08K 3/32 | (2006.01) |

(52) U.S. Cl.
CPC . *C09C 1/40* (2013.01); *C09D 5/028* (2013.01); *C09D 7/1283* (2013.01); *C01B 25/36* (2013.01); *C08K 3/32* (2013.01); *C09D 5/084* (2013.01); *C09C 1/0084* (2013.01); *C01P 2006/11* (2013.01); *C09D 7/1216* (2013.01)
USPC ........................... 106/404; 423/308; 423/311

(58) Field of Classification Search
USPC .......................................... 423/308, 311, 323
See application file for complete search history.

(56) References Cited

U.S. PATENT DOCUMENTS

| | | | | |
|---|---|---|---|---|
| 2,222,198 | A | * | 11/1940 | Fleck .......................... 162/181.2 |
| 2,222,199 | A | * | 11/1940 | Fleck .......................... 162/181.2 |
| 2,974,054 | A | * | 3/1961 | Beamesderfer et al. ...... 106/486 |
| 4,542,001 | A | * | 9/1985 | Iino et al. ...................... 423/311 |
| 6,150,033 | A | * | 11/2000 | Mosser et al. ................ 428/469 |
| 6,444,134 | B1 | * | 9/2002 | Holman et al. .................. 216/29 |
| 2006/0045831 | A1 | * | 3/2006 | Galembeck et al. ........... 423/311 |
| 2006/0112849 | A1 | * | 6/2006 | Maze et al. ................. 106/14.05 |
| 2007/0272117 | A1 | * | 11/2007 | Staffel et al. ............... 106/14.12 |

FOREIGN PATENT DOCUMENTS

| | | |
|---|---|---|
| DE | 10 2006 024869.4 | 11/2007 |
| EP | 1860159 | 11/2007 |
| WO | WO-2006/024959 | 3/2006 |

OTHER PUBLICATIONS

Morales et al., "The Mechanism of Precipitation of Colloidal Variscite (AlPO$_4$•2H$_2$O) Particles", Journal of Colloid and Interface Science, vol. 151, No. 2., pp. 555-562, Jul. 1992.

Beppu et al., "Self-Opacifying Aluminum Phosphate Particles for Paint Film Pigmentation", Journal of Coatings Technology, vol. 69, No. 867, pp. 81-88, Apr. 1997.

\* cited by examiner

*Primary Examiner* — Pegah Parvini
(74) *Attorney, Agent, or Firm* — Venable LLP; Keith G. Haddaway; Annette K. Kwok

(57) ABSTRACT

The present invention provides white pigments of crystalline aluminum orthophosphate dihydrate, their use as white pigment in paints and also processes for their production.

16 Claims, No Drawings

ALUMINIUM PHOSPHATE DIHYDRATE AS WHITE PIGMENT IN PAINTS

The present invention relates to the use of aluminum orthophosphate dihydrate as white pigment with anti-corrosion properties in paints, varnishes and the like, as well as to a process for producing same.

A large number of white pigments are known. As components of paints, varnishes and other types of coating materials, these pigments are intended to cover the treated, different-colored background with the highest possible degree of whiteness. Of course, they need to be compatible with the remaining components of the paint. The preferred white pigments include titanium dioxide, which exhibits an extremely high degree of whiteness not only in the form of a powder, but also when used in paints. However, when produced with the required degree of purity, it is also extremely expensive. For that reason, attempts were made to replace it either completely or in part with other white pigments or filler materials. Frequently used, for example, are calcium carbonate (lime), calcium sulfate (gypsum), aluminum silicate (alumina, kaolin), magnesium silicate (talcum), aluminum oxide and zinc oxide. However, since all these products do not achieve the covering capacity of titanium oxide, larger amounts of these products must be used than of titanium oxide which reduces the abrasion resistance and leads to a higher requirement for binding agents. Titanium oxide is therefore always used for high-quality paints.

From the document WO 2006/024959 A2, it is known that amorphous aluminum phosphate, which encloses air pockets because of a special production process, can be used as white pigment in paints, in particular when used together with titanium dioxide. However, since this product has extremely high oil-absorption values resulting from the amorphous structure and therefore binds a great deal of the solvents in the paints, this type of paint has no storage stability because it thickens up, except in cases where small pigment amounts are used. The high amount of binding agent used additionally results in a reduction of the abrasion resistance.

It is furthermore known from the document DE 10 2006 024869.4 A1 that a mixture of amorphous aluminum phosphate and crystalline anhydrous aluminum phosphate (berlinite) can be used as anti-corrosion agent in paints intended for metal surfaces. However, these agents also cannot be used in sufficiently high amounts as white pigment because of the high oil-absorption value.

A need for usable white pigments therefore continues to exists, as well as the object to provide these types of pigments.

Surprisingly, it has now been discovered that aluminum orthophosphate as dihydrate has an extremely high degree of whiteness which nearly reaches that of titanium dioxide not only when used as a powder, but also when used in paints. As a result of the crystalline structure and the accompanying, low oil-absorption value, the requirement for binding agent and solvent is lower, so that the paints will not thicken up and furthermore have a higher abrasion resistance. When used in combination with titanium dioxide, these properties are further improved.

The above-stated object is thus solved with a white pigment of crystalline aluminum orthophosphate dihydrate.

Aluminum orthophosphate dihydrate is a known compound which occurs in nature, for example in the form of variscite.

The pigments according to the invention are produced in the known manner through conversion reaction of aluminum compounds with phosphoric acid or phosphates in an aqueous solution at increased temperatures, in particular at temperatures between 80-120° C., wherein the poorly soluble aluminum orthophosphate is precipitated out as crystalline dihydrate, respectively re-crystallizes from the initially precipitated out amorphous product and is then separated out. For example, aluminum hydroxide can be converted with phosphoric acid or aluminum sulfate can be converted with sodium phosphate. This is followed by a drying interval and, if desired, by grinding to obtain the required grain size.

A grinding, respectively a sorting or straining operation follows if the grain size of the resulting aluminum orthophosphate is not fine enough. The grain size should advantageously be in the range of $D_{50}$ 1-15 μm and $D_{90}$ 1-30 μm, wherein $D_{90}$ is above $D_{50}$ and, in particular, should be $D_{50}=10$ μm and $D_{90}=15$ μm. It is furthermore preferable if the maximum grain share for which the grain size exceeds 32 μm is approximately 0.01%.

The bulk density is advantageously in the range of 300 to 1000 g/l and in particular in the range of 500 to 900 g/l.

The aluminum orthophosphate dihydrate white pigment according to the invention is suitable for replacing the titanium dioxide in paints and can be used in primers as well as in top coats. In addition to being suitable for use as white pigment, it also has a good anti-corrosion effect and can therefore also be used as anti-corrosion agent for metal undersurfaces. The paints for which the aluminum orthophosphate dihydrate can be used include water-based paints and solvent-based paints, water-based and solvent-based varnishes, as well as glazes or translucent coatings.

The formulation for these types of paints is known per se to one skilled in the art. They generally contain water or an organic solvent as a fluid, a binding agent in the form of non-volatile synthetic resins, admixtures for controlling the flow behavior and the curing, light stabilizers, preserving agents, antifoaming agents and the like, as well as pigments for adjusting the desired coloration. The concrete formulations depend, among other things, on the undersurface to be coated, the type of paint, the intended application method and the like. For reasons of environmental protection and because of the fire danger of organic solvents, watery synthetic resin dispersions are nowadays preferred as base material for the paint. For additional details we refer to the comprehensive description disclosed in the above-mentioned WO2006/024959 A2.

Aluminum orthophosphate dihydrate is highly compatible with the components normally contained in paints. Approximately 5 to 20 weight % of aluminum orthophosphate dihydrate are typically mixed into the paints, wherein higher shares could also be used, if applicable, in cases where the paint is to be diluted prior to the application.

The following examples are intended to further illustrate the invention without restricting it to the concrete embodiments described herein. All % provided relate to the weight unless otherwise indicated.

EXAMPLE 1

Production of Aluminum Orthophosphate Dihydrate

Phosphoric acid (583 g 84%, 5.0 mol) is mixed into 1600 ml water as starting preparation which is then heated to approximately 110° C. Following this, aluminum hydroxide (410 g, wet hydrate with 5% water, 5.0 mol) is stirred into the mixture in batches, respectively waiting each time until a batch is completely dissolved, wherein the reaction mixture heats up to approximately 120° C. and is subsequently cooled to the room temperature. The precipitated out crystalline solids are suctioned off with the aid of a paper filter (S&S No. 604 Ø=110 mm), are washed with 65 ml water and dried over night at 110° C.

The yield is 929 g, corresponding to 96.3%.

In the powder diffractogram, the product exhibits the typical reflexes of the dihydrate at 37, 39, 42° and 66° (4-theta scale).

EXAMPLE 2

Production of the Paints

To produce formulations for a comparison, known formulations are modified by replacing the titanium dioxide in part or completely with the aluminum orthophosphate dihydrate according to the invention, respectively the known amorphous aluminum phosphate (AP).

1) Standard Formulation for Interior Paint (Partial Replacement of $TiO_2$)

| Amount in g | Substance |
| --- | --- |
| 267.5 | water |
| 1.0 | phosphate dispersing agent |
| 3.0 | cellulose ether |
| 1.0 | KOH (potassium hydroxide) |
| 1.5 | acrylate dispersing agent |
| 130.0 | natural $CaCO_3$ (5 μm) |
| 80.0 | pigment |
| 110.0 | vinyl acetate dispersion |
| 200.0 | natural $CaCO_3$ (2.5 μm) |
| 80.0 | precipitated out $CaCO_3$ (0.3 μm) |
| 50.0 | natural $CaCO_3$ (5 μm) |
| 50.0 | talcum |
| 40.0 | kaolin |
| 1.0 | PU (polyurethane) thickener |
| 2.0 | preserving agents |
| 3.0 | antifoaming agent |
| Σ 1000 | |

1a) pigment titanium dioxide 80 g
1b) pigment titanium dioxide 40 g, aluminum orthophosphate dihydrate 20 g
1c) pigment titanium dioxide 40 g, amorphous aluminum phosphate 10 g
1d) pigment titanium dioxide 40 g, amorphous aluminum phosphate 20 g 1) Standard Formulation for Interior Paint (Replacement of $TiO_2$)

| Amount in g | Substance |
| --- | --- |
| 266.0 | water |
| 1.0 | phosphate dispersing agent |
| 3.0 | cellulose ether |
| 1.0 | KOH |
| 3.0 | acrylate dispersing agent |
| 1.0 | antifoaming agent |
| 150.0 | natural $CaCO_3$ (5 μm) |
| 60.0 | pigment |
| 110.0 | vinyl acetate dispersion |
| 200.0 | natural $CaCO_3$ (2.5 μm) |
| 60.0 | precipitated out $CaCO_3$ (0.3 μm) |
| 50.0 | natural $CaCO_3$ (5 μm) |
| 50.0 | talcum |
| 40.0 | kaolin |
| 1.0 | PU thickener |
| 2.0 | preserving agent |
| 2.0 | antifoaming agent |
| Σ 1000 | |

1e) pigment titanium dioxide 60 g
1f) pigment aluminum orthophosphate dihydrate 60 g
1g) pigment aluminum orthophosphate, amorphous 60 g 2) Standard Formulation for Silicone Resin Paint

| Amount in g | Substance |
| --- | --- |
| 250.0 | water |
| 1.0 | phosphate dispersing agent |
| 3.0 | cellulose ether |
| 1.0 | KOH |
| 3.0 | acrylate dispersing agent |
| 1.0 | antifoaming agent |
| 120.0 | pigment |
| 80.0 | talcum |
| 80.0 | kaolin |
| 100.0 | natural $CaCO_3$ (2.5 μm) |
| 100.0 | natural $CaCO_3$ (5 μm) |
| 130.0 | styrene acrylate dispersion |
| 6.0 | solvent naphtha |
| 110.0 | silicone resin dispersion |
| 10.0 | hydrophobing agent |
| 2.0 | preserving agent for container |
| 7.0 | film-forming preserving agent |
| 4.0 | PU thickener |
| 2.0 | antifoaming agent |
| Σ 1000 | |

2a) pigment titanium dioxide 120 g
2b) pigment titanium dioxide 60 g; aluminum orthophosphate dihydrate 60 g
2c) pigment titanium dioxide 60 g; amorphous aluminum phosphate 60 g 3) Standard Formulation for Exterior Paint

| Amount in g | Substance |
| --- | --- |
| 197.0 | water |
| 3.0 | cellulose ether |
| 1.0 | phosphate dispersing agent |
| 1.0 | KOH |
| 3.0 | acrylate dispersing agent |
| 220.0 | natural $CaCO_3$ (5 μm) |
| 180.0 | pigment |
| 300.0 | styrene acrylate dispersing agent |
| 2.0 | antifoaming agent |
| 40.0 | talcum |
| 30.0 | kaolin |
| 15.0 | solvent naphtha |
| 2.0 | preserving agent for container |
| 2.0 | film-forming preserving agent |
| 2.0 | antifoaming agent |
| 2.0 | PU thickener |
| Σ 1000 | |

3a) pigment titanium dioxide 180 g
3b) pigment titanium dioxide 90 g; aluminum orthophosphate dihydrate 90 g
3c) pigment titanium dioxide 90 g; amorphous aluminum phosphate 90 g 4) Stability During Storage The stability during storage was determined with the aid of viscosity measurements. For this test, the paints were stored for a period of four weeks at 50° C. The viscosity was measured the day after production and then once every week. It has turned out that the paints containing the amorphous aluminum orthophosphate either had a high starting viscosity or had solidified after only one week, such that a viscosity measurement could no longer be realized. The paints containing aluminum orthophosphate dihydrate exhibited the same viscosity during the complete test period.

| Paint | Viscosity mPa/s on the first day | Viscosity mPa/s after 4 weeks |
|---|---|---|
| 1a) pigment titanium dioxide 80 g | 34000 | 83000 |
| 1b) pigment titanium dioxide 40 g aluminum orthophosphate dihydrate 20 g | 14700 | 14050 |
| 1c) pigment titanium dioxide 40 g; amorphous aluminum phosphate 10 g | 40400 | 45800 |
| 1d) pigment titanium dioxide 40 g; amorphous aluminum phosphate 20 g | 69200 | 68200 |
| 1e) pigment titanium dioxide 60 g | 19200 | 19700 |
| 1f) pigment aluminum orthophosphate dihydrate 60 g | 17200 | 17150 |
| 1g) pigment aluminum orthophosphate; amorphous 60 g | solidified during the production | |
| 2a) pigment titanium dioxide 120 g | 18150 | 16200 |
| 2b) pigment titanium dioxide 60 g aluminum orthophosphate dihydrate 60 g | 27700 | 30300 |
| 2c) pigment titanium dioxide 60 g amorphous aluminum phosphate 60 g | 26000 | solidified after one week |
| 3a) pigment titanium dioxide 180 g | 12450 | 13200 |
| 3b) pigment titanium dioxide 90 g aluminum orthophosphate dihydrate 90 g | 31100 | 30200 |
| 3c) pigment titanium dioxide 90 g amorphous aluminum phosphate 90 g | 34450 | solidified after one week |

5) Comparison of the Degree of Whiteness

The degree of whiteness of the various formulations was determined by applying a 300 μm thick layer of paint with the aid of a spatula to a black PVC foil. Following a drying period of 5 days, the light reflected as a result of diffuse illumination is measured at an angle of 0° (Minolta; chroma meter CR 200).

| Paint | Y (value of luminance of the CIE paint system) |
|---|---|
| 1a) pigment titanium dioxide 80 g | 90.8 |
| 1b) pigment titanium dioxide 40 g aluminum orthophosphate dihydrate 20 g | 89.3 |
| 1c) pigment titanium dioxide 40 g amorphous aluminum phosphate 10 | 86.6 |
| 1d) pigment titanium dioxide 40 g amorphous aluminum phosphate 20 g | 89.1 |
| 1e) pigment titanium dioxide 60 g | 89.2 |
| 1f) pigment aluminum orthophosphate dihydrate 60 g | 87.8 |
| 1g) pigment aluminum orthophosphate; amorphous 60 g | too solid for applying it |
| 2a) pigment titanium dioxide 120 g | 87.7 |
| 2b) pigment titanium dioxide 60 g aluminum orthophosphate dihydrate 60 g | 84.5 |
| 2c) pigment titanium dioxide 60 g amorphous aluminum phosphate 60 g | 88.1 |
| 3a) pigment titanium dioxide 180 g | 87.7 |
| 3b) pigment titanium dioxide 90 g aluminum orthophosphate dihydrate 90 g | 82.9 |
| 3c) pigment titanium dioxide 90 g amorphous aluminum phosphate 90 g | 86.7 |

6) Abrasion Loss

The abrasion loss (abrasion resistance) was determined according to the DIN E Standard 13 300. For this, a 300 μm thick paint layer of the different types of formulations was applied with the aid of a spatula to a black PVC foil. Following a drying period of 4 weeks, the coated sample foil was weighed and subjected to 200 abrasion cycles in an abrasion testing device. The sample was then washed, dried and weighed again. The loss of mass was determined, from which the average layer thickness loss was then computed.

| Paint | Abrasion loss [μm] |
|---|---|
| 1a) pigment titanium dioxide 80 g | 58 |
| 1b) pigment titanium dioxide 40 g aluminum orthophosphate dihydrate 20 g | 40 |
| 1c) pigment titanium dioxide 40 g amorphous aluminum phosphate 10 g | 76 |
| 1d) pigment titanium dioxide 40 g amorphous aluminum phosphate 20 g | 84 |

The above-provided examples show that titanium dioxide in paints can be replaced with the aluminum orthophosphate dihydrate according to the invention, wherein the degree of whiteness is slightly lower. Even if 50% of the titanium dioxide is replaced with only 25% aluminum orthophosphate dihydrate, the degree of whiteness is reduced only slightly. The degree of whiteness of the paints is comparable to the formulations in which the titanium dioxide was replaced with the amorphous aluminum phosphate. However, when using the amorphous aluminum phosphate, a replacement at the same amount is not possible because of the high oil-absorption value since the paint is not stable and solidifies during the production or after only one week.

Surprisingly, the abrasion resistance is increased considerably as compared to all formulations used for comparison. The reason for this could be a lower oil-absorption value of the aluminum orthophosphate dihydrate. As a result, a lower amount of binding agent is required which leads to an increase in the abrasion resistance as compared to paints that contain titanium dioxide.

The invention claimed is:

1. A white pigment for paints which comprises white aluminum orthophosphate dihydrate in crystalline form.

2. The white pigment according to claim 1, characterized in that the aluminum orthophosphate has a grain size $D_{50}$ of 1-15 μm and $D_{90}$ of 1-30 μm.

3. The white pigment according to claim 1, characterized in that the aluminum orthophosphate has a bulk density of 300 to 1000 g/l.

4. A paint for painting interior or exterior regions comprising white crystalline aluminum orthophosphate dihydrate as white pigment in combination with other white pigments.

5. A method for making the white pigment according to claim 1, comprising the following steps:
   a) reacting an aluminum salt and/or an aluminum hydroxide with phosphoric acid and/or a phosphate in an aqueous phase at temperatures ranging from 80-120° C.;
   b) precipitating out white aluminum orthophosphate dihydrate in crystalline form;
   c) filtering the white aluminum orthophosphate dihydrate and
   d) drying the white aluminum orthophosphate dihydrate dihydrate in crystalline form.

6. The method according to claim 5, further comprising grinding or screening the aluminum orthophosphate from step d), so as to obtain a grain size $D_{50} \leq 15$ μm and $D_{90} \leq 30$ μm.

7. The method according to claim 5, characterized in that the aluminum hydroxide is reacted with phosphoric acid.

8. The method according to claim 5, characterized in that the aluminum salt is an aluminum sulfate and is reacted with sodium phosphate.

9. The method for producing a white pigment according to claim 5, further comprising dispersing the white pigment from step d) in an aqueous fluid.

10. The paint according to claim 4, wherein the other white pigment comprises titanium dioxide.

11. The method for producing a white pigment according to claim 5, further comprising dispersing the white pigment from step d) in an organic solvent fluid.

12. The white pigment for paints of claim 1, consisting essentially of white aluminum orthophosphate dihydrate in crystalline form.

13. The white pigment for paints of claim 1, consisting of white aluminum orthophosphate dihydrate in crystalline form.

14. A white pigment for paints consisting essentially of white aluminum orthophosphate dihydrate in crystalline form, which is obtained by
 a) reacting an aluminum salt and/or an aluminum hydroxide with phosphoric acid and/or a phosphate in an aqueous phase at temperatures ranging from 80-120° C.;
 b) precipitating out the white aluminum orthophosphate dihydrate in crystalline form by cooling;
 c) filtering the white aluminum orthophosphate dihydrate;
 d) drying the white aluminum orthophosphate dihydrate; and
 e) grinding the white aluminum orthophosphate diyhydrate a grain size of $D_{50} \leq 15$ μm and $D_{90} \leq 30$ μm and to a bulk density of 300 to 1000 g/l.

15. A white pigment for paints comprising white aluminum orthophosphate dihydrate in crystalline form, which is obtained by a method consisting essentially of the steps of:
 a) reacting an aluminum salt and/or an aluminum hydroxide with phosphoric acid and/or a phosphate in an aqueous phase at temperatures ranging from 80-120° C.;
 b) precipitating out the white aluminum orthophosphate dihydrate in crystalline form by cooling;
 c) filtering the white aluminum orthophosphate dihydrate;
 d) drying the white aluminum orthophosphate dihydrate.

16. The white pigment of claim 15, wherein the method of obtaining the white aluminum orthophosphate dihydrate in crystalline form further includes the step of
 e) grinding the white aluminum orthophosphate diyhydrate a grain size of $D_{50} \leq 15$ μm and $D_{90} \leq 30$ μm and to a bulk density of 300 to 1000 g/l.

* * * * *